(12) United States Patent
Paula et al.

(10) Patent No.: US 11,455,501 B2
(45) Date of Patent: Sep. 27, 2022

(54) RESPONSE BASED ON HIERARCHICAL MODELS

(71) Applicant: Hewlett-Packard Development Company, L.P., Spring, TX (US)

(72) Inventors: Thomas Paula, Porto Alegre (BR); Carlos Leao, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 133 days.

(21) Appl. No.: 16/770,740

(22) PCT Filed: Feb. 21, 2018

(86) PCT No.: PCT/US2018/019060
§ 371 (c)(1),
(2) Date: Jun. 8, 2020

(87) PCT Pub. No.: WO2019/164484
PCT Pub. Date: Aug. 29, 2019

(65) Prior Publication Data
US 2021/0174151 A1    Jun. 10, 2021

(51) Int. Cl.
*G06K 9/62* (2022.01)
*G06N 3/04* (2006.01)
*G06V 10/70* (2022.01)

(52) U.S. Cl.
CPC .......... *G06K 9/6267* (2013.01); *G06K 9/626* (2013.01); *G06N 3/0454* (2013.01); *G06V 10/768* (2022.01)

(58) Field of Classification Search
CPC .... G06K 9/6267; G06K 9/626; G06V 10/768; G06N 3/0454
See application file for complete search history.

(56) References Cited

U.S. PATENT DOCUMENTS

| 8,954,330 | B2 | 2/2015 | Koenig et al. |
| 2002/0087525 | A1 | 7/2002 | Abbott et al. |
| 2009/0148068 | A1 | 6/2009 | Woodbeck |
| 2009/0268947 | A1* | 10/2009 | Schaufler ............... G06V 20/58 382/104 |
| 2011/0191271 | A1 | 8/2011 | Baker et al. |
| 2012/0016678 | A1 | 1/2012 | Gruber et al. |
| 2013/0346068 | A1* | 12/2013 | Solem ................. G06F 16/5866 704/9 |
| 2014/0172892 | A1 | 6/2014 | Schechter et al. |
| 2015/0142824 | A1 | 5/2015 | Tipton et al. |
| 2015/0149430 | A1 | 5/2015 | Flake et al. |
| 2015/0162000 | A1 | 6/2015 | Di Censo et al. |
| 2017/0133014 | A1 | 5/2017 | Sharifi et al. |
| 2019/0171913 | A1* | 6/2019 | Cheng ................... G06N 3/082 |

OTHER PUBLICATIONS

Adomavicius, G. et al., "Context-Aware Recommender Systems", AI Magazine, pp. 67-80, Fall 2011.

* cited by examiner

Primary Examiner — Fayyaz Alam
(74) Attorney, Agent, or Firm — Amin Turocy & Watson LLP (57) ABSTRACT

Examples disclosed herein relate to determining a response based on hierarchical models. In one implementation, a processor applies a first model to an image of an environment to select a second model. The processor applies the selected second model to the image and creates an environmental description representation based on the output of the second model. The processor determines a response based on the environmental description information.

15 Claims, 5 Drawing Sheets

RESPONSE BASED ON HIERARCHICAL MODELS

BACKGROUND

An electronic assistant may provide a user information in response to a query. For example, the electronic assistant may receive a voice query from a user, and the electronic assistant may communicate with a cloud based system to determine a response to the query. The electronic assistant may provide voice output to the user to indicate the response.

BRIEF DESCRIPTION OF THE DRAWINGS

The drawings describe example embodiments. The following detailed description references the drawings, wherein.

DETAILED DESCRIPTION

In one implementation, a processor may apply hierarchical cascading models to an image of an environment to determine a context of the environment. For example, the context information may provide environmental intelligence related to the location type or people or objects in the environment depicted in the image. The processor may parse a query and/or command based on the determined context and may determine a response to the parsed query and/or command. For example, the processor may be associated with an electronic assistant, such as a voice assistant, robot, or smart camera. A user may verbally make a request of the electronic assistant, and the electronic assistant may respond differently based on environmental context. The electronic assistant may determine environmental context based on an image of the environment. For example, the image may be captured by a camera associated with the electronic assistant or associated with the user's environment, such as a camera associated with a room in which the electronic assistant is located. The query and/or command may be parsed based on cascading hierarchical models. For example, the processor may apply a first model and select a second model based on the output of the first model.

As an example, a user may request "Turn on the light," and a processor may determine which light based on environmental context information determined from an image of the user's location. Hierarchical cascading models may be applied to determine the environmental context information in an efficient manner.

Responding to a query and/or command based on environmental context may provide a more useful response to a user. For example, the same query and/or command may be interpreted differently based on time of day, the person asking, an occurrence of an event, or where the query and/or command is presented. Applying cascading models to determine the context may allow the system to more quickly identify contextual information by applying models that are more likely to be relevant. For example, the hierarchical filtering may allow for more applicable models to be applied in response to the output of a previously applied model and reduce the time of applying models less likely to provide useful information. A query and/or command response using environmental intelligence generated based on hierarchical models may automatically provide a more tailored response without a user providing detailed manual input.

Figure 1:
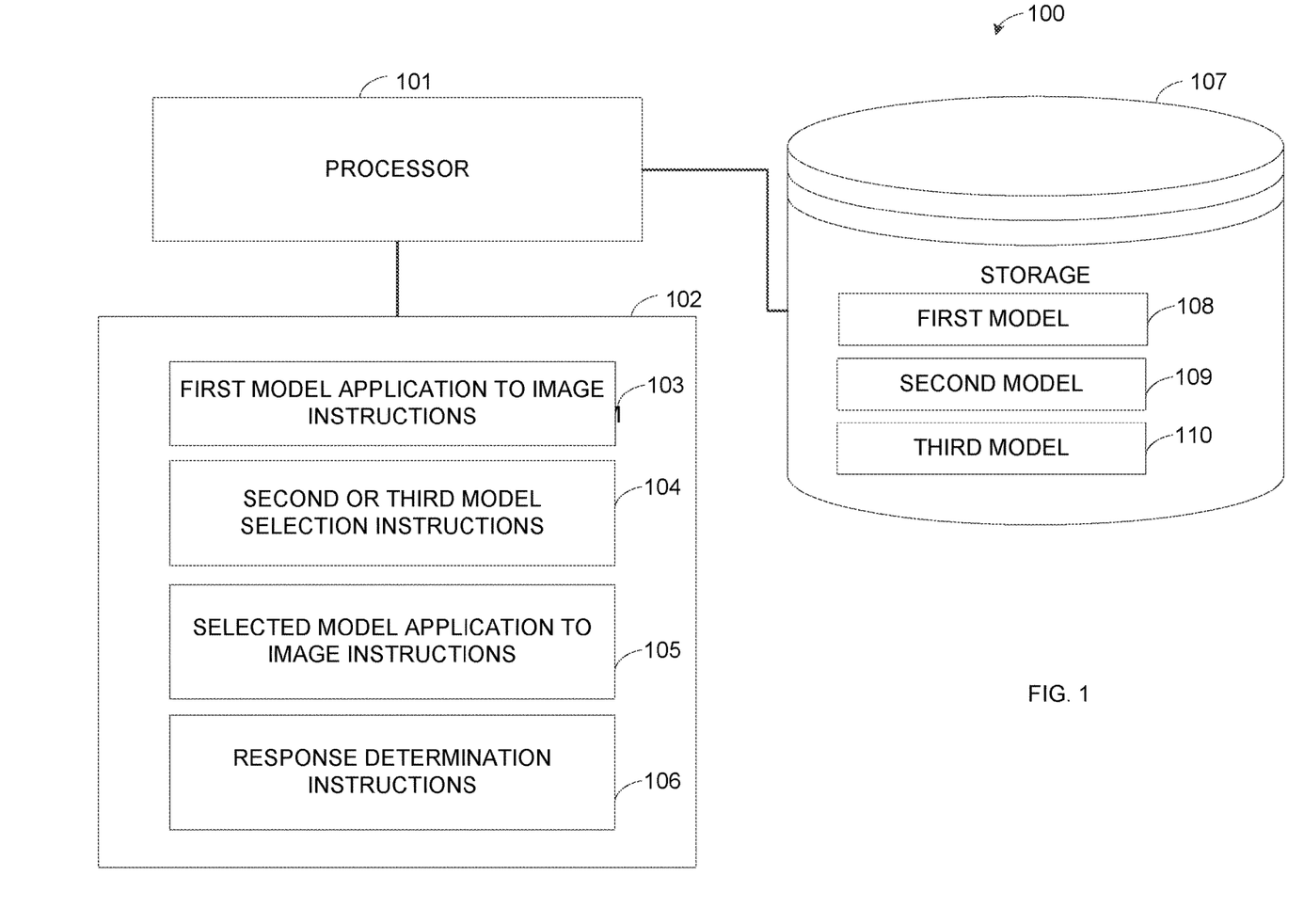
FIG. 1 is a block diagram illustrating one example of a computing system to provide a response based on hierarchical models.

FIG. 1 is a block diagram illustrating one example of a computing system to provide a response based on hierarchical models. The computing system 100 includes a processor 101, machine-readable storage medium 102, and storage 107. The computing system 100 may be associated with an electronic assistant, such as a voice assistant or other electronic assistant for providing a response to a query and/or command. The computing system 100 may receive a query and/or command, such as via voice, keyboard, and/or gesture input. The computing system 100 may be associated with a single device or may be part of a cloud system for communicating with multiple devices.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with storage 107. The storage may be the same or separate from the machine-readable storage medium 102. In one implementation, the processor 101 communicates with the storage 107 via a network. For example, the storage 107 may store multiple models available to multiple processors associated with different electronic assistants that communicate with the storage 107 via a network.

The storage 107 may store first model 108, second model 109, and third model 110. The first model 108, second model 109, and third model 110 may be image classification models. The second model 109 and the third model 110 may be sub-models of the first model 108 in a hierarchy. In one implementation, the third model 110 is a sub-model of the second model 109. The models may have a hierarchical relationship such that the output of a first model is used to select a second model to apply. In one implementation, the first model 108 is related to location type. For example, the first model 108 may be applied to an image to determine information about the type of location, and another model, such as the second model 109 or the third model 110, is selected based on the determined location type.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 includes first model application to image instructions 103, second or third model selection instructions 104, selected model application to image instructions 105, and response determination instructions 106.

The first model application to image instructions 103 may include instructions to apply the first model 108 to an image to determine a context associated with the environment of the image. For example, the computing system 100 may receive an image or may include a camera to capture an image. In one implementation, the computing system 100 is associated with an electronic assistant, and the electronic assistant captures an image of its environment. The image may be captured when a communication, such as a query and/or command, is initiated, when the location of a camera or other device is established, or at regular intervals. For example, the environment of an electronic assistant may change because the electronic assistant is moved to a different room or because objects in the same room change over time.

The context may be any suitable context, such as related to a location type, objects in the location, people in the vicinity, or an event type at the location. The first model 108 may determine the context in any suitable manner, such as using a machine learning method. The first model 108 may be a convolutional neural network trained for scene recognition. For example, the first model 108 may be trained on a set of input images associated with different context types. The first model 108 may output information about context and confidence level associated with the context. The confidence level may be used to select a second model or to determine whether to use the output from the first model 108. For example, a different model may be selected in the same hierarchy level if the confidence level is below a threshold. In one implementation, multiple models may be applied where the confidence level of the output of the parent model is below a threshold for selecting a model.

The second or third model selection instructions 104 may include instructions to select at least one of the second and third model based on the determined context. As an example, the second model 109 may be a model to determine information about a home location, and the third model 110 may be a model to determine information about an office location. If the output from the first model 108 indicates that the location is in a home, the processor 101 may select the second model 109 to apply to the image. The second model 109 and the third model 110 may be convolutional neural network models trained to recognize objects of a particular type such that the second model 109 is related to a first object type and third model 110 is related to a second object type.

The selected model application to image instructions 105 may include instructions to apply the selected model to the image. For example, if the second model 109 is selected, the processor 101 may apply the second model 109 to the image. The second model 109 may be applied to the entire image or a segment of the image tailored to the second model 109. The models may have any suitable level of hierarchy. For example, the output of the second model 109 may be used to select a fourth or fifth model to apply.

The response determination instructions may include instructions to determine a response to a query and/or command based on output from the selected model. For example, the processor 101 may parse the query and/or command based on the output of the selected model and determining an answer to the parsed query and/or command. The environmental context information determined based on the models may be stored and searchable such that it may be accessed to parse a communication, such as a query or command. The environmental context information may include a list of objects and/or people in the environment and their corresponding locations. In one implementation, the processor 101 updates the query and/or command based on the context and transmits the updated query and/or command to a search engine to retrieve a response. The processor 101 may parse the query and/or command using a machine learning model for natural language processing or other model and update the parsed query and/or command based on the context information prior to determining a response. In one implementation, the second electronic assistant uses the received information to parse queries that it may receive in the future.

The query and/or command may be a request to perform an action, and the processor 101 may determine the requested action based on the context information. The processor 101 may cause the requested to occur and/or transmit a request to a second electronic device to perform the action.

In one implementation, the processor 101 uses the context information for additional purposes. For example, the processor 101 may transmit information about the determined context and/or the output from the selected model to a second electronic device to cause the second electronic device to behave differently. For example, a home may include multiple electronic assistants, and a first electronic assistant may transmit information to a second electronic assistant to alter the way the second electronic behaves, such as its volume.

Figure 2:
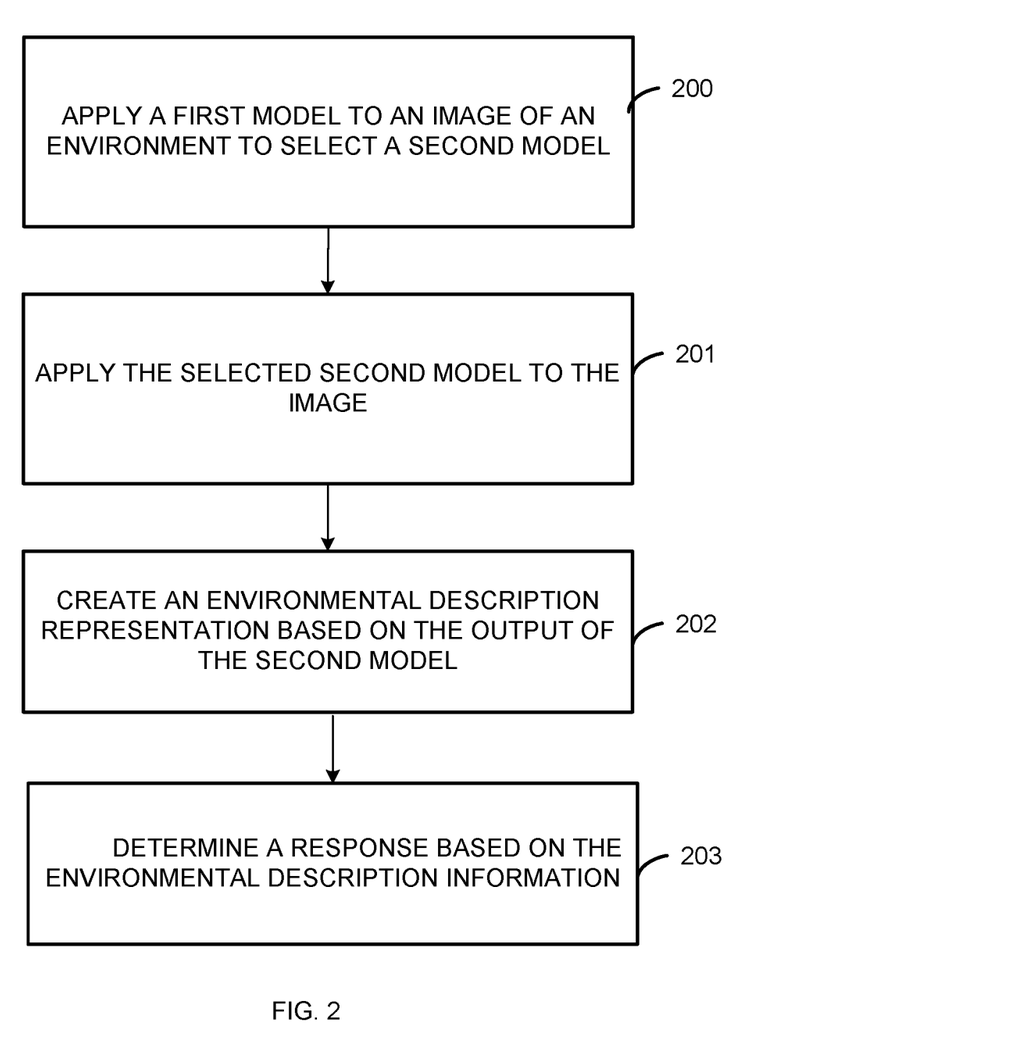
FIG. 2 is a flow chart illustrating one example of a method to provide a response based on hierarchical models.

FIG. 2 is a flow chart illustrating one example of a method to provide a response based on hierarchical models. A subsequent model may be selected in a hierarchical manner based on the output from a previously applied model. The models may be machine learning models that receive an image as input and output information about an environmental description associated with the image. The environmental description may be used for determining a response to query and/or command, such as a query and/or command requested from the same location that the image was captured. The method may be implemented, for example, by the computing system 100 of FIG. 1.

Beginning at 200, a processor applies a first model to an image of an environment to select second model. The first model may be any suitable model. In one implementation, the first model is a machine-learning model trained on a set of images. The first model may be trained on images of different environment types, and the first model may be trained and updated with new training images. The output of the first model may be related to a description associated with the environment in which the image was taken. The output of the first model may be related to a location type associated with the image. For example, the first model may output information related to a location type and confidence level. The location type may be a room type.

The image may be any suitable image. For example, the image may be of an environment from an electronic assistant, robot, or other camera associated with a query and/or command. There may be multiple images to be input into the model, such as multiple images of the same location at different time periods or images of the same location from multiple angles. The environment may be an area around a user or electronic device.

The processor may select the second model in any suitable manner. For example, there may be a model associated with each output type from the first model, such as where the first model outputs the probability that an image is indoors and outdoors and where a second model is associated with indoors and a third model is associated with outdoors. The first model and second model may be directed to different types of analysis. For example, the first model may be a facial recognition model, and the second model may be an object recognition model. In one implementation, multiple sub-models are selected, such as where a first model related to indoors and outdoors determines that the location is likely indoors and additional models related to facial and object recognition are applied that are associated with an indoors determination. In one implementation, the first model segments the image into different object types and different models are applied to the different segments.

Continuing to 201, the processor applies the selected second model to the image. The second model may be any suitable model. The second model may be a machine learning model that classifies images. The second model may classify subjects or objects within the image, such as by segmenting and identifying an object or identifying an object provided in a segment of the image to the second model. In one implementation, the model is related to a particular object type. For example, the second model may be provided an image of a couch, and the second model determines information about the couch, such as brand. In one implementation, the output of the second model is related to attributes of objects in the image.

The processor may select any suitable level of hierarchical models. For example, an additional model may be selected based on the output from the selected second model. There may be a stored cascade of hierarchical models including information about a relationship between models in the hierarchy such that the output of a first model is used to select a second model in the hierarchy.

In one implementation, the processor determines environmental description information associated with the image based on the output from the models. For example, the processor may determine how many people are at the location or whether a particular type of event is occurring in the image based on the output from the models. The output from different models may be used to determine different aspects of the context, such as where a first branch in a hierarchy includes models to output information related to people, and a second branch in the hierarchy includes models to output information related to objects Continuing to 202, the processor creates an environmental description representation based on the output of the second model. The processor may create the environmental description representation based on the output of models in addition to the second model, such as models above and below the second model in a hierarchy. In one implementation, the environmental description representation is created with different levels or types of details on the same object or person where the different details are provided from different models. The objects recognized in the image may be stored to create searchable environmental description information. The output from a model may include sets of data including object type, object position, and confidence level for each identified object in the image, and the environmental description representation may include objects or people recognized in the image from multiple models.

Continuing to 203, the processor determines a response to a based on the environmental description information. A query and/or command may be received in any suitable manner, such as via voice, keyboard, or from a second electronic device. The query and/or command may be any suitable query and/or command, such as a query and/or command to a search engine or a query and/or command to command an electronic device to perform an action. The query and/or command may refer to objects in the user's environment. As an example, if a user asks what painting is on the wall, the processor may use the environmental description information to determine a response to the query and/or command.

The processor may parse the query and/or command based on the environmental description representation such that query and/or command terms are interpreted based on the context representation. For example, pronouns may be interpreted based on objects and people identified in the image. The processor may parse the query and/or command in any suitable manner. In one implementation, the processor updates the query and/or command based on the environmental description information and provides the query and/or command to a search engine with the updated query and/or command terminology. The processor may receive a response and provide the response to a user, such as via audio or visual information.

Figure 3:
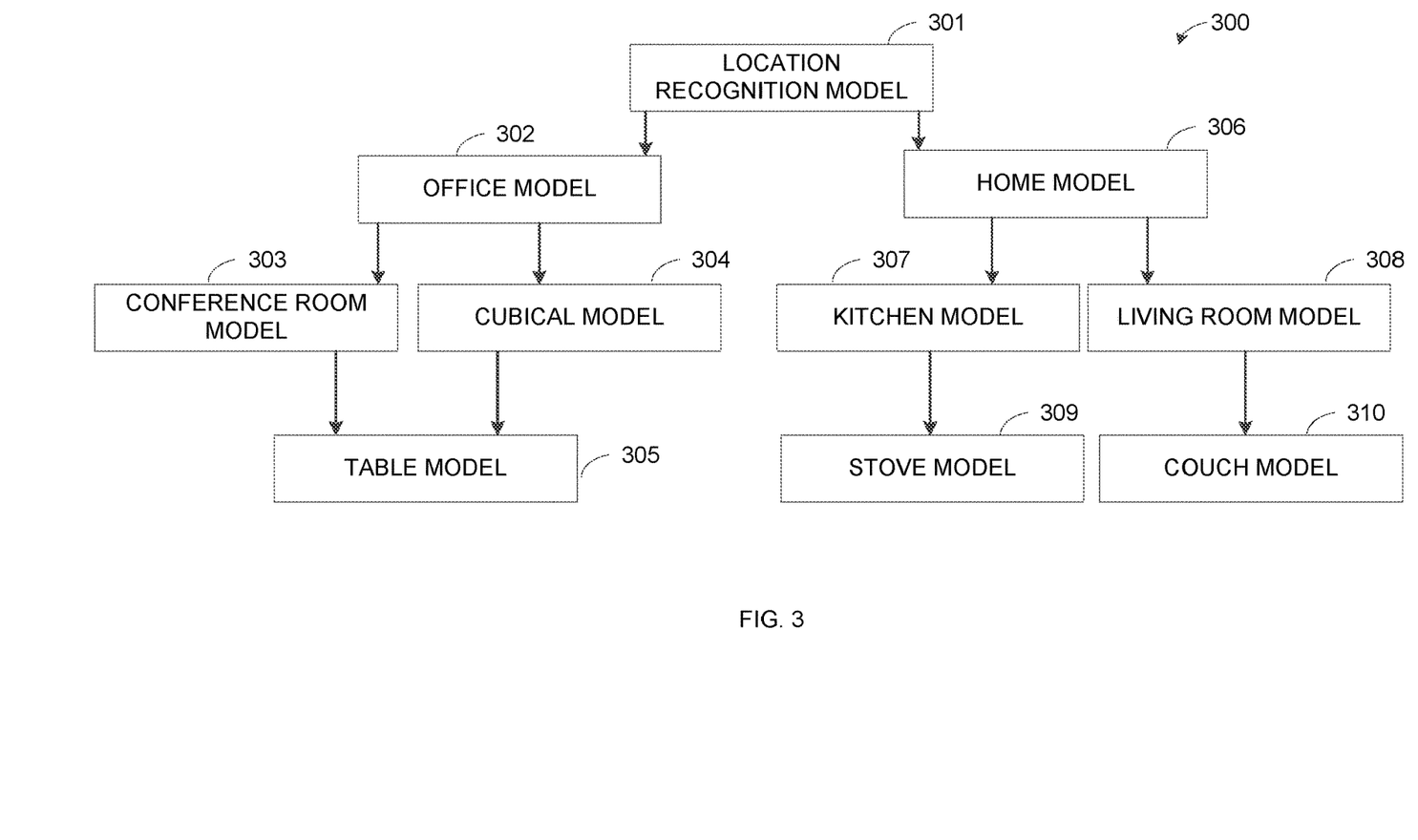
FIG. 3 is a diagram illustrating one example of relationships between a set of hierarchical models.

FIG. 3 is a diagram illustrating one example of relationships between a set of hierarchical models 300. For example, the output from a higher model in the hierarchy may be used to select a model lower in the hierarchy. Location recognition model 301 is the first model in the hierarchy. Based on the output of the location recognition model 301, a processor may determine to apply office model 302 or home model 306. If the processor selects the office model 302, the processor may apply the office model 302 and determine whether to select the conference room 303 or cubical model 304 based on the output from the office model 302. The processor may select to apply the table model 305 after either the cubical model 303 or the conference room model 304. In one implementation, the output from the cubical model 303 is an image segment or position coordinates on which to run the table model 305.

If the processor selects the home model 306, the processor may select kitchen model 307 or living room model 308 based on the output from the home model 306. After the kitchen model 307, the processor may apply the stove model 309, and after the living room model, the processor may apply the couch model 310. The processor may not apply cubical model 302 if the home model 306 indicates that the image is likely to be in a home environment with a level of confidence above a threshold. By applying models that are more likely to provide relevant information, the processor may save time and resources from applying models unlikely to provide useful information.

Figure 4:
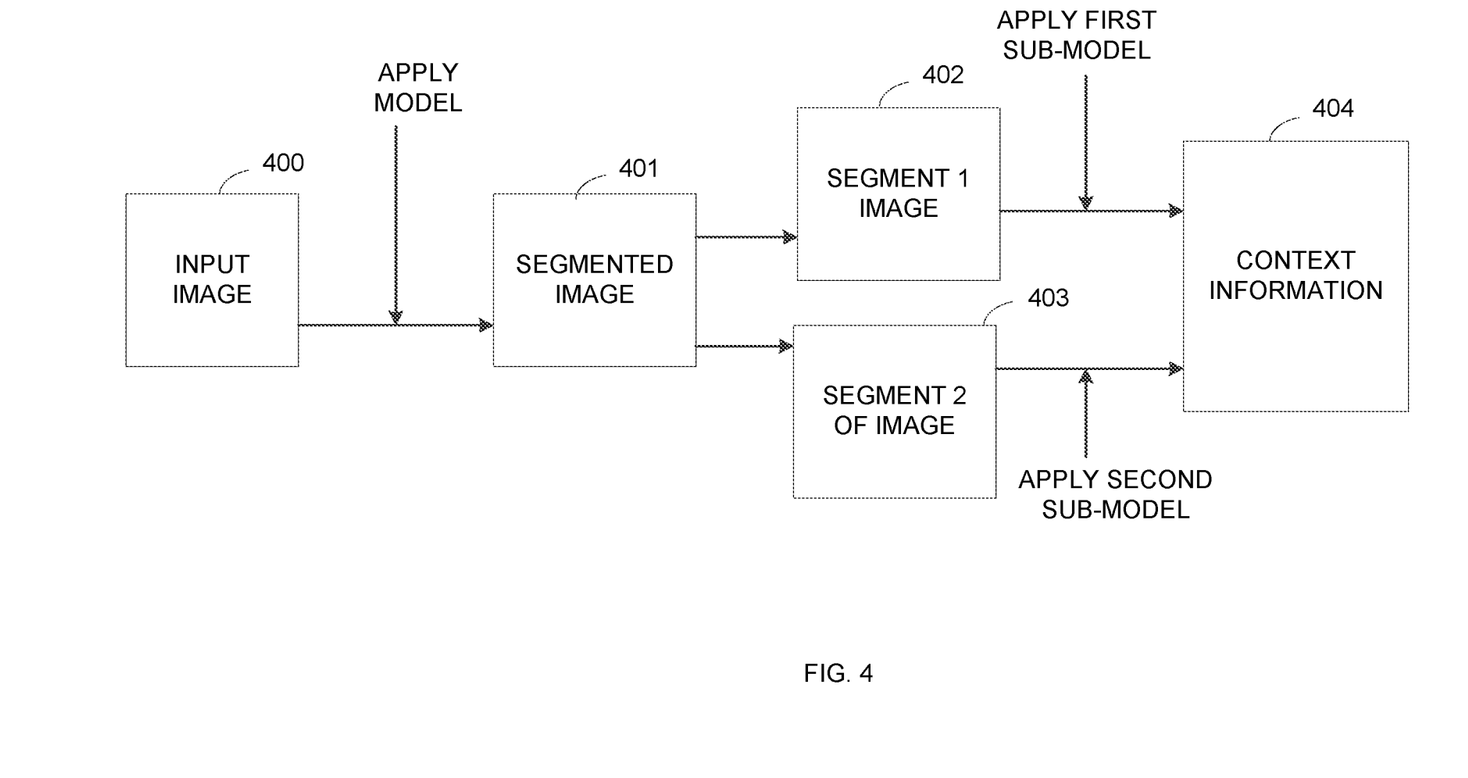
FIG. 4 is a flow chart illustrating one example of applying a hierarchical set of models to an image to extract environmental description information used to parse a communication.

FIG. 4 is a flow chart illustrating one example of applying a hierarchical set of models to an image to extract environmental description information used to parse a communication. Input image 400 may be captured from a camera by a user or captured automatically by a camera associated with a location or electronic assistant. A model, such as a scene recognition model, may be applied to the input image 400, and the output of the model may be segmented image 401. The model may be a machine leaning model used to classify an image. In one implementation, the model classifies different areas of the image that are then segmented for further analysis. For example, segmented image 401 may include multiple segments associated with different object types. Segmented image 401 may include segment 1 image 402 and segment 2 image 403. A different sub-model may be applied to each segment. For example, a first sub-model may be applied to segment 1 image 402, and a second sub-model may be applied to segment 2 image 403. The output from the first sub-model and the second sub-model may be used to form context information 404. In one implementation, additional information from the first model is also used to determine the environmental context. Context information 404 may be stored and used to parse queries received in a location where the input image 400 was received.

Figure 5:
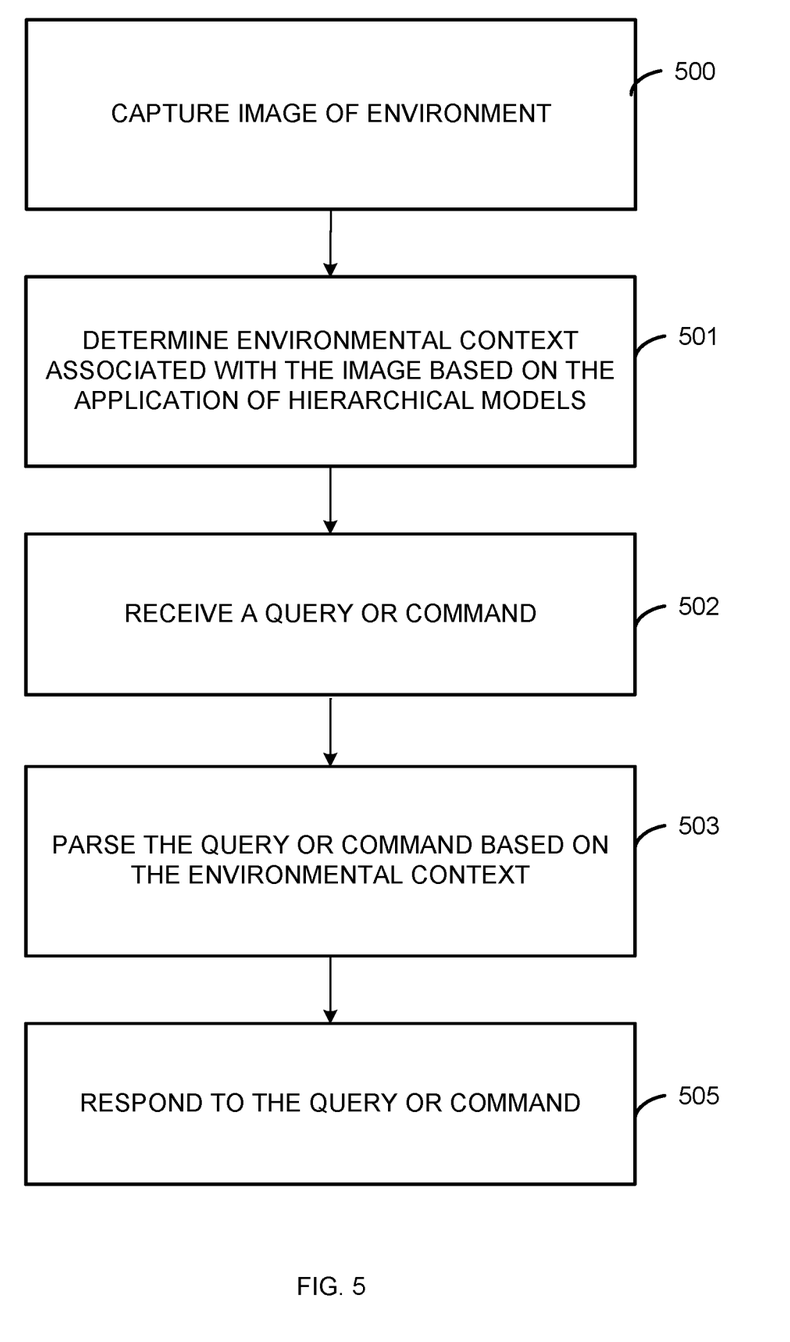
FIG. 5 is a flow chart illustrating one example of a method to respond to a query and/or command.

FIG. 5 is a flow chart illustrating one example of a method to respond to a query and/or command. For example, a processor may interpret a query and/or command based on information determined based on hierarchical models applied to an image associated with the query and/or command. The method may be implemented, for example, by the computing system 100 of FIG. 1.

Beginning at 500, a processor captures image of environment. For example, the image may be of a room. In one implementation, multiple images are captured to be analyzed. For example, the images maybe be images of different areas of the location or the images may be of the same location at different times. The images may be captured at any suitable time. In one implementation, the images are captured to be used to determine context information that is stored. An image may be captured in response to a query and/or command, such as to be used on its own or to be compared to stored image information taken prior to the query and/or command request. The image may be associated with a location of a device for receiving a query and/or command or may be in a separate location associated with the query and/or command request, such as where a user in a living room requests information about an item in the kitchen.

Continuing to 501, the processor determines environmental context associated with the image based on the application of hierarchical models. For example, the context may include a location type, people or objects present, or an occurrence of an event. The context information may be any suitable information used to provide a layer of context to a request. The context information may be stored to be accessed when a query and/or command is received. For example, the context information may be indexed such that it may be searched when a query and/or command is received.

Continuing to 502, the processor receives a query or command. The query or command may be a voice request or other query or command from a user. They query or command may be, for example, a request for information or a command perform an action.

Continuing to 503, the processor parses the query or command based on the environmental context. For example, a word or phrase may be interpreted based on the determined context information. The same question may be parsed differently if asked in a kitchen than if asked at the office or if different people or objects are present in an image of the area.

Continuing to 504, the processor responds to the query or command. For example, the processor may determine a response based on the parsed query and/or command interpretation, resulting in a different answer depending on the context. In one implementation, the processor performs an action based on the query or command. Responding to a query and/or command using environmental intelligence may provide a better user experience. Determining the context information based on hierarchical models may allow for an efficient manner to determine environmental information associated with a query and/or command.

The invention claimed is:

1. A computing system comprising:
   a storage to store a group of image classification models;
   a processor to:
   apply a first model of the group of image classification models to an image to determine first environmental context information associated with a context of an environment depicted in the image;
   select at least one additional model of the group of image classification models to apply to the image based on the first environmental context information;
   apply the at least one additional model to the image to determine second environmental context information;
   determine a response to a query from a user in the environment based on a context representation generated from the first environmental context information and the second environmental context information.

2. The computing system of claim 1, wherein the at least one additional model comprises a second model and a third model.

3. The computing system of claim 2, wherein the processor is further to apply the second model to a first segment of the image and the third model to a second segment of the image.

4. The computing system of claim 1, wherein the first environmental context information comprises a location type.

5. The computing system of claim 4, wherein the at least one additional model is selected based on the location type.

6. The computing system of claim 1, wherein the second environmental context information is related to object types in the image.

7. The computing system of claim 1, wherein determining the response comprises:
   interpreting the query based on the context representation; and
   determining the response based on the interpreting of the query.

8. The computing system of claim 1, wherein the processor is further to transmit information about at least one of the first environmental context information or the second environmental context information to a second electronic device to cause the second electronic device to behave in a particular manner.

9. A method, comprising:
   applying, by a processor, a first neural network model of a group of neural network models to an image of an environment to determine initial environmental context information associated with a context of the environment depicted in the image;
   applying, by the processor, a second neural network model of the group of neural network models to the image to generate additional environmental context information, wherein the second neural network model is selected based on the initial environmental context information;
   creating, by the processor, an environmental description representation based on the initial environmental context information and the additional environmental context information; and
   determining, by the processor, a response to a query from a user in the environment based on the environmental description representation.

10. The method of claim 9, wherein the initial environmental context information comprises a location type of the environment.

11. The method of claim 9, wherein the environmental description representation includes information about objects and corresponding positions of the objects in the image.

12. The method of claim 9, wherein determining the response comprises:
   determining the response based on interpretating the query using at least one of the initial environmental context information or the additional environmental context information.

13. A machine-readable non-transitory storage medium comprising instructions executable by a processor to:
   apply a first machine learning model of hierarchical cascading machine learning models to an image of an environment to determine a first description of the environment;
   applying, by the processor, at least one additional machine learning model of the hierarchical cascading machine learning models to the image to determine a second description of the environment, wherein the at least one additional model machine learning is selected based on the first description of the environment;
   parse at least one of a query or a command from a user in the environment based on the second description of the environment; and
   determine a response to the parsed at least of the query or the command.

14. The machine-readable non-transitory storage medium of claim 13, wherein the first description of the environment comprises a location type.

15. The machine-readable non-transitory storage medium of claim 13, wherein the second description of the environment comprises at least one of an object type of an object in the environment, an object position in the environment of the object, or a confidence level of the second description of the environment.

* * * * *